(12) United States Patent
Harter et al.

(10) Patent No.: US 10,939,676 B1
(45) Date of Patent: Mar. 9, 2021

(54) MODULAR PLATFORM SYSTEM

(71) Applicants: Joel Edward Harter, Fort Wayne, IN (US); Tony Ryan Cronk, Fort Wayne, IN (US); Matthew Jason Harmeyer, Coldwater, MI (US); Edgard Eugene Herran, Fort Wayne, IN (US)

(72) Inventors: Joel Edward Harter, Fort Wayne, IN (US); Tony Ryan Cronk, Fort Wayne, IN (US); Matthew Jason Harmeyer, Coldwater, MI (US); Edgard Eugene Herran, Fort Wayne, IN (US)

(73) Assignee: Summit Outdoors, LLC, Fort Wayne, IN (US)

(*) Notice: Subject to any disclaimer, the term of this patent is extended or adjusted under 35 U.S.C. 154(b) by 0 days.

(21) Appl. No.: 16/577,452

(22) Filed: Sep. 20, 2019

Related U.S. Application Data

(60) Provisional application No. 62/733,715, filed on Sep. 20, 2018.

(51) Int. Cl.
| | |
|---|---|
| *A01M 31/02* | (2006.01) |
| *E04G 5/08* | (2006.01) |
| *E04G 5/10* | (2006.01) |
| *A47B 87/00* | (2006.01) |

(52) U.S. Cl.
CPC .......... *A01M 31/025* (2013.01); *A01M 31/02* (2013.01); *A47B 87/002* (2013.01); *E04G 5/08* (2013.01); *E04G 5/10* (2013.01)

(58) Field of Classification Search
CPC .......... B65D 19/00; B65D 2519/00547; A47B 87/00; A47B 87/002; A47B 1/00
USPC .................... 108/54.1, 56.1, 64, 65
See application file for complete search history.

(56) References Cited

U.S. PATENT DOCUMENTS

| | | | | |
|---|---|---|---|---|
| 2,377,211 | A | * | 5/1945 | Cocken, Jr. ............. E04F 15/06 |
| | | | | 404/40 |
| 2,596,663 | A | * | 5/1952 | Duffy ................... A47B 87/002 |
| | | | | 108/69 |
| 3,077,426 | A | * | 2/1963 | Johnston ................... E04B 1/54 |
| | | | | 181/286 |
| 3,207,095 | A | * | 9/1965 | Hiatt, Jr. ............ A47B 87/0223 |
| | | | | 108/53.5 |
| D226,421 | S | | 3/1973 | Rich |
| 4,062,301 | A | * | 12/1977 | Pitchford .............. B23P 19/041 |
| | | | | 108/56.1 |
| D248,447 | S | | 7/1978 | Hornung |
| D267,308 | S | | 12/1982 | France |
| 4,694,962 | A | * | 9/1987 | Taub .................. B65D 19/0073 |
| | | | | 108/185 |

(Continued)

OTHER PUBLICATIONS

Summit Oudoors, LLC, Elevator Product, Photograph, Feb. 20, 2018, 1 page.

(Continued)

*Primary Examiner* — Jose V Chen
(74) *Attorney, Agent, or Firm* — Barnes & Thornburg LLP

(57) ABSTRACT

A modular platform system includes a base module and at least one extension module. One side of the base module has a recess for receiving a connector on one side of the extension module to connect the extension module to the base module. The extension module may include a recess for receiving a connecting member on a second extension module to connect the second extension module to the extension module.

15 Claims, 10 Drawing Sheets

(56) References Cited

U.S. PATENT DOCUMENTS

| | | | |
|---|---|---|---|
| D322,551 S | 12/1991 | Tosevski | |
| 5,377,944 A | 1/1995 | Getsinger | |
| 5,524,856 A | 6/1996 | Neely et al. | |
| 5,661,946 A | 9/1997 | Davis | |
| 6,003,449 A * | 12/1999 | Manidis | B65D 19/16 |
| | | | 108/51.11 |
| 6,032,590 A * | 3/2000 | Chen | A47B 3/06 |
| | | | 108/158.12 |
| 6,085,668 A * | 7/2000 | Kanki | A47B 87/002 |
| | | | 108/64 |
| 6,234,087 B1 * | 5/2001 | Brown | B65D 19/0034 |
| | | | 108/55.1 |
| 6,244,558 B1 | 6/2001 | Castle | |
| 6,263,807 B1 * | 7/2001 | Fox | B65D 19/0073 |
| | | | 108/54.1 |
| D474,676 S | 5/2003 | Bainbridge | |
| 6,561,739 B1 * | 5/2003 | Garala | B62D 21/12 |
| | | | 410/35 |
| D484,029 S | 12/2003 | Bainbridge | |
| 6,751,912 B2 * | 6/2004 | Stegner | E01C 5/20 |
| | | | 52/177 |
| 7,802,527 B2 * | 9/2010 | Dong | B65D 19/001 |
| | | | 108/54.1 |
| 8,584,598 B2 * | 11/2013 | Derkoski | A47B 3/12 |
| | | | 108/14 |
| 8,701,570 B2 * | 4/2014 | Wilson | B65D 19/0016 |
| | | | 108/54.1 |
| 8,904,714 B2 * | 12/2014 | Montalto | E04G 21/3209 |
| | | | 108/131 |
| 2009/0232632 A1 * | 9/2009 | Baltz | B65D 19/0002 |
| | | | 414/800 |
| 2015/0320201 A1 * | 11/2015 | Meadows | A63H 19/30 |
| | | | 108/64 |
| 2016/0015177 A1 * | 1/2016 | Blake | A47B 7/02 |
| | | | 108/64 |

OTHER PUBLICATIONS

Summit Outdoors, LLC, Elevator Product, Photographs, Jan. 30, 2018, 4 pages.
GSM LLC, GSM Bracket, Photograph, Feb. 20, 2018, 1 page.
GSM LLC, Elevator Product, Photograph, Jan. 30, 2018, 1 page.
Summit Outdoors, Made to Build. Built to Last, Product Brochure, Jan. 1, 2015, 2 pages.
Amazon, HME Multi-Use Platform Brackets, Website, https://www.amazon.com/HME-Multi-Use-Brackets-Observation-Platforms/dp/B07BGJ5ZQ8#customereReviews, Sep. 20, 2018, 8 pages.
Cabelas, Maverick Blinds Nex-Level Platform Mounts—Four Pack, Website, https://www.cabelas.com/product/Maverick-Blinds-Nex-Level-Platform-Mounts-Four-Pack/, Sep. 20, 2018, 1 page.
Southern Outdoor Technologies, Sportsman's Condo: Sportsman's EZ Bracket, Website, https://www.sportsmancondo.com/productpages/EZBracket.htm, Sep. 20, 2018, 4 pages.
Chas-Mac, Inc., Series 150-Chas-Mac Towers, Website, http://www.chas-mac.com/towers.htm, Sep. 20, 2018, 4 pages.
E-Z-Tower, Turbine E-Z Tower Hunting Blind Brackets, Website, http://www.e-ztowercom, Sep. 20, 2018, 12 pages.

* cited by examiner

MODULAR PLATFORM SYSTEM

The present invention relates to a modular platform system. This application claims priority of and from U.S. Patent Application No. 62/733,715 filed Sep. 20, 2018.

BACKGROUND AND SUMMARY OF THE INVENTION

Platform systems are known in the prior art. Examples of such systems are shown in U.S. Pat. Nos. 10,145,129, 10,246,868 and 10,358,871.

In one embodiment of the present invention, a modular platform system includes a base module and an extension module. The base module has an upper surface, a lower surface, a first side, a second side, a third side, and a fourth side. A recess in the first side of the base module has a first open section facing outwardly from the first side and a second, narrower open section facing outwardly from first side. A connecting member extends from the first side of the extension module. The connecting member has a first section and a second, narrower section and is configured to engage the recess in the first side of the base module to secure the extension module to the base module.

In one embodiment, the modular platform system further includes a recess in the third side of the extension module and a second extension module. The recess in the third side of the extension module has a first open section facing outwardly from the third side and a second, narrower open section facing outwardly from third side. The second extension module has an upper surface, a lower surface, a first side, a second side, a third side, and a fourth side. A connecting member extends from the first side of the second extension module. The connecting member of the second extension module has a first section and a second, narrower section. The connecting member of the second extension module is configured to engage the recess in the third side of the extension module to secure the second extension module to the extension module.

DETAILED DESCRIPTION OF EMBODIMENTS OF THE INVENTION

Figure 1:
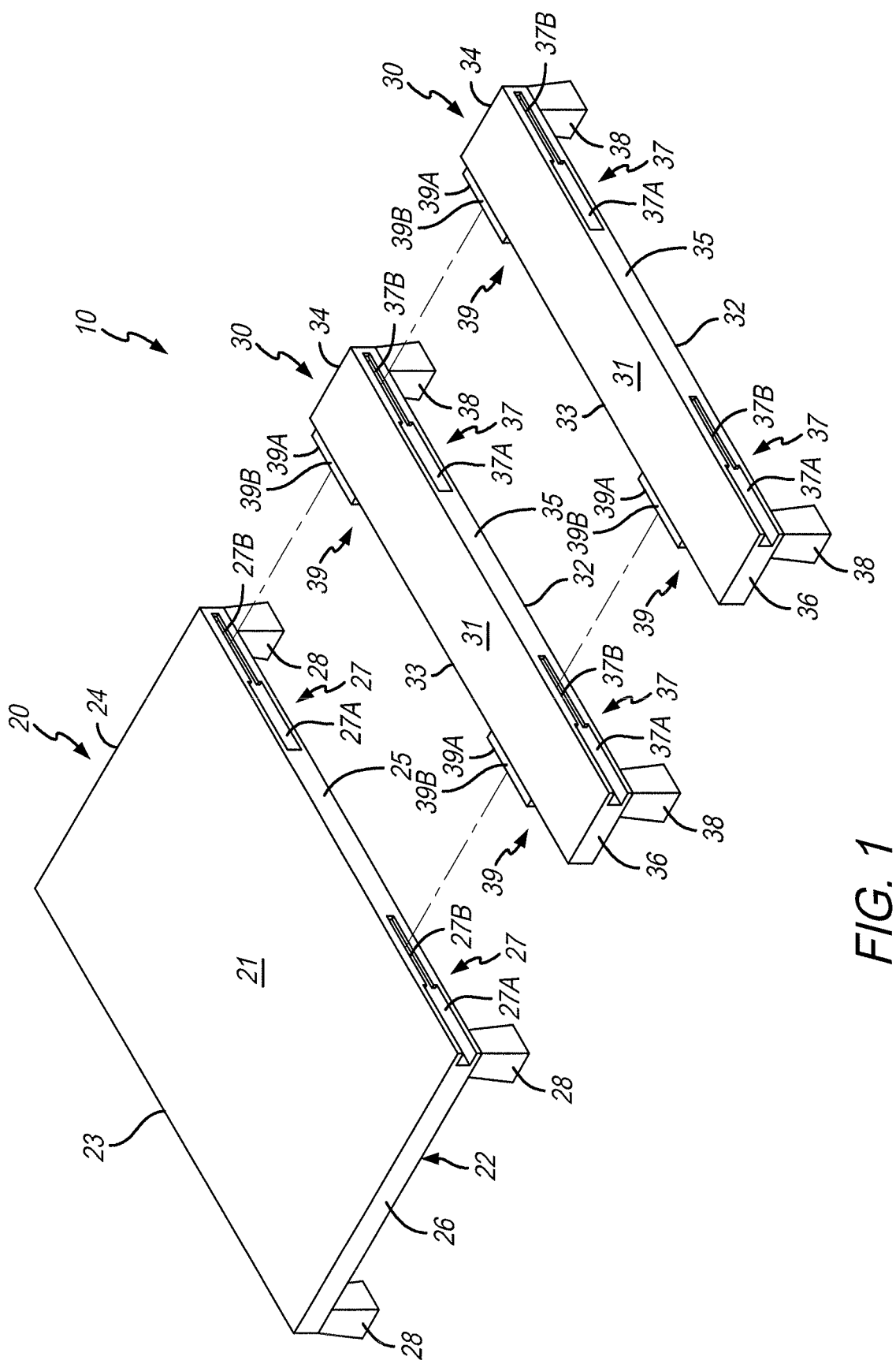
FIG. 1 is an exploded perspective view of a modular platform system according to one embodiment of the present invention.

FIG. 1 an exploded perspective view of a modular platform system according to one embodiment of the present invention. In the embodiment shown, modular platform system 10 includes a first or base module 20 and one or more extension modules 30.

Base module 20 includes an upper surface 21, a lower surface 22, a first side 23, a second side 24, a third side 25 and a fourth side 26. In the embodiment shown, third side 25 is provided with one or more recesses 27, each of which has a first open section 27A facing outwardly from third side 25 and a second open section 27B facing outwardly from third side 25. First open section 27A is, in the embodiment shown, wider than second open section 27B. Base module 20 further includes four legs 28 (three of which are shown in FIG. 1) disposed near each corner of base module 20. Legs 28 can be used to support base module 20 on a surface. Alternatively, legs 28 can, in certain embodiments of the invention, have internal recesses for receiving posts, boards or other support members on which base module 20 can be placed to elevate base module 20 further above a surface than would be achieved by resting legs 28 on the surface. In other embodiments of the invention, legs 28 are eliminated and lower surface 22 of base module 20 is provided with recesses for receiving such posts, boards or support members.

Each extension module 30 includes an upper surface 31, a lower surface 32, a first side 33, a second side 34, a third side 35 and a fourth side 36. In the embodiment shown, third side 35 is provided with one or more recesses 37, each of which has a first open section 37A facing outwardly from third side 35 and a second open section 37B facing outwardly from third side 35. First open section 37A is, in the embodiment shown, wider than second open section 37B. Each extension module 30 further includes a leg 38 disposed near each end of extension module 30. Legs 38 can be used to support extension module 30 on a surface. Alternatively, legs 38 can, in certain embodiments of the invention, have internal recesses for receiving posts, boards or other support members on which extension module 30 can be placed to elevate extension module 30 further above a surface than would be achieved by resting legs 38 on the surface. In other embodiments of the invention, legs 38 are eliminated and lower surface 32 of extension module 30 is provided with recesses for receiving such posts, boards or support members. Each extension module 30 further includes connecting members 39 extending from first side 33 of extension module 30. Connecting members 39 include a first or larger section 39A and a second or narrower section 39B.

Figure 2:
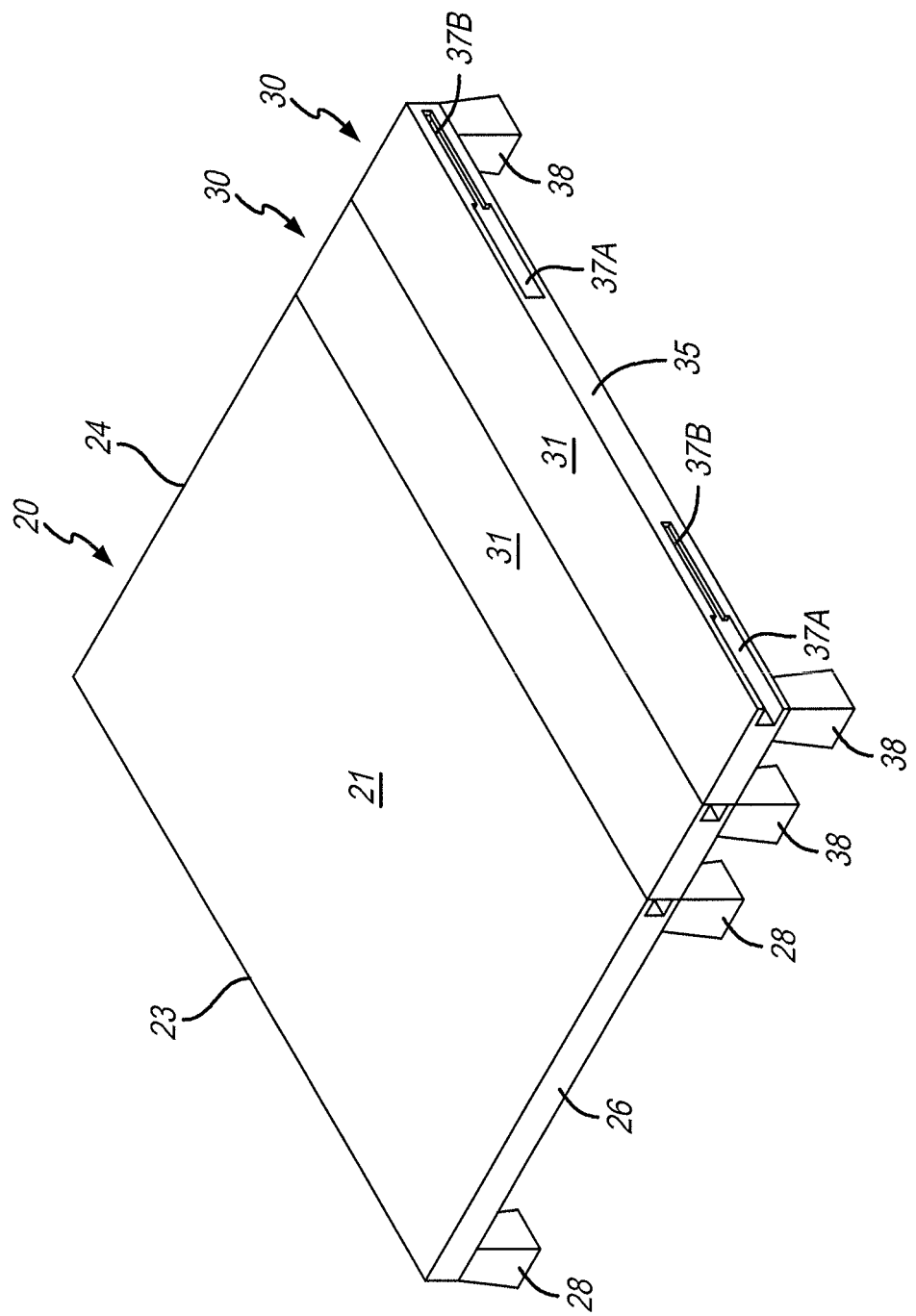
FIG. 2 is a perspective view of the modular platform system of FIG. 1 in an assembled configuration.

Connecting members 39 and recesses 27, in the embodiment shown, are a dovetail connecting system. As shown in FIGS. 1 and 2, connecting members 39 are sized and configured such that larger section 39A can be inserted into first open sections 27A of recesses 27, after which extension modules 30 may be slid toward second side 24 of base module 20. Second open sections 27B of recesses 27 and second section 39B of connecting members 39 are sized such that second section 39B of connecting members 39 can slide into second open section 27B of recesses 27, thereby positioning first section 39A of connecting members 39 in recesses 27 behind second open section 27B of recesses 27.

First section 39A of connecting member 39 is sized and shaped such that it cannot be pulled outwardly through second open section 27B of recesses 27. This configuration connects extension module 30 to base module 20.

In a similar fashion, an extension module 30 can be attached to another extension module 30 by engaging connecting members 39 on one extension module 30 with recesses 37 in another extension module 30. FIG. 2 shows a first extension module 30 joined to base module 20 and a second extension module 30 joined to the first extension module 30 in this manner.

Figure 3:
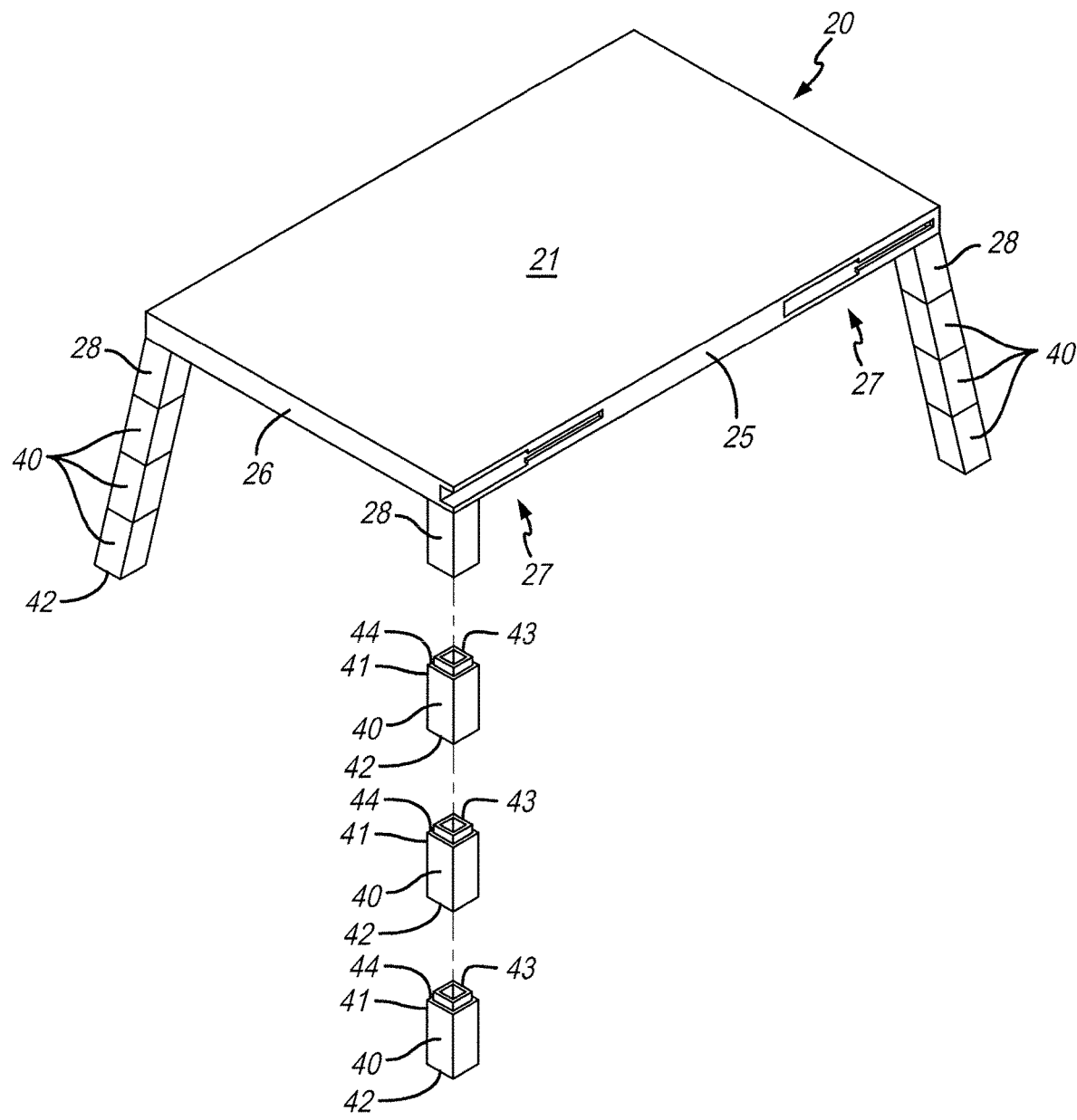
FIG. 3 is a perspective view of a modular platform system according to another embodiment of the present invention.
Figure 4:
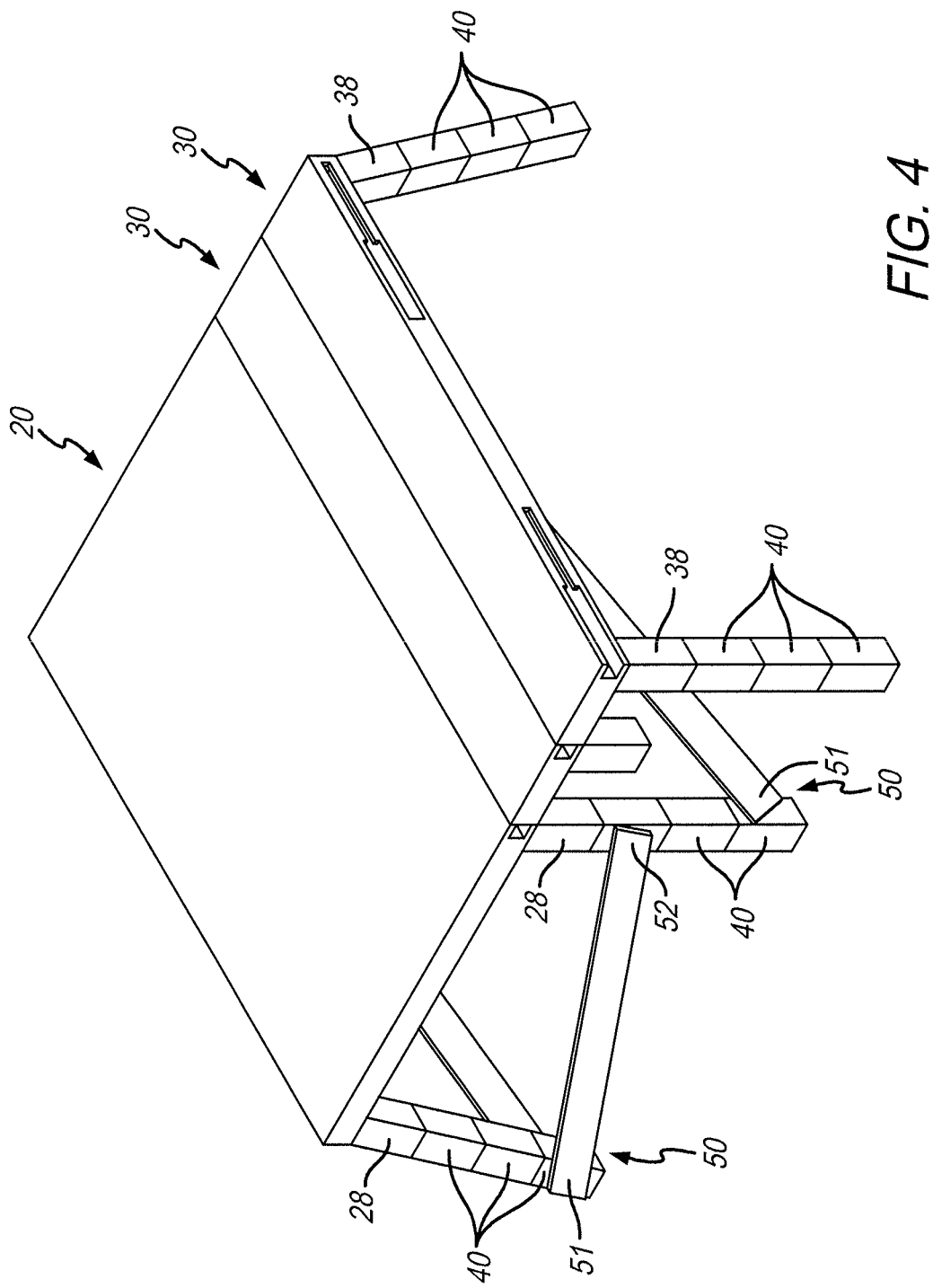
FIG. 4 is a perspective view of a modular platform system according to another embodiment of the present invention.

FIG. 3 shows a modular platform system according to another embodiment of the present invention. In this embodiment, a plurality of modular support members 40 may be used to raise the platform above a surface to a desired height. Each modular support member 40 includes a first end 41 and a second end 42. A projection 43 extends from first end 41. In the embodiment shown, projection 43 is narrower than the remainder of modular support member 40. This configuration creates a lip 44 on first end 41 of modular support member 40 surrounding projection 43. Second end 42 of modular support member 40 includes a recessed area. Projection 43 is sized and configured to nest within recesses in legs 28 of base module 20, recesses in legs 38 of extension modules 30 and recesses in second end 42 of another modular support member 40. In this manner, one or more modular support members 40 can be engaged with base module 20 (as shown in FIG. 3), extension modules 30 (as shown in FIG. 4) and/or other modular support members 40 to elevate base module 20 and extension modules 30 above a surface at a desired height. Modular support members 40 may be secured to base module 20, extension modules 30 and/or other modular support members 40 by any of a number of means, including a snap-fit connection, interlocking connection or through the use of screws or other fasteners. Lip 44 forms a stop surface that will engage the surface surrounding the recess into which projection 43 is inserted.

FIG. 4 shows a modular platform system according to another embodiment of the present invention. In this embodiment, two extension modules 30 are joined to base module 20 and are elevated by use of modular support members 40. In this embodiment, the modular platform system is further stabilized by use of bracing members 50. Bracing members 50 may be connected at a first end 51 to one modular support member 40 and at a second end 52 to a different modular support member 40 as shown in FIG. 4. Bracing members 50 may be secured to modular support members 40 by any of a number of means, including a snap-fit connection, interlocking connection or through the use of screws or other fasteners. Alternatively, bracing members 50 could be integrally formed with a modular support member 40 on each end.

FIGS. 5A, 5B, 5C and 5D show a modular staircase/ladder structure 60 that is a component of modular platform systems according to certain embodiments of the present invention. In the embodiment shown, modular staircase/ladder structure 60 generally includes stringers 70, treads 80, handrail 90 and brackets 100.

Each stringer 70 includes a first surface 71, a second surface 72, a first end 73 and a second end 74. First ends 73 of stringers 70 include a slot 75 and second ends 74 of stringers 70 include a connecting member 76 extending therefrom. Slots 77 extend through first surface 71 and second surface 72 of stringers 70. Connecting members 76 are configured to engage slots 75 in first ends 73 of stringers 70 so as to join multiple stringers 70 together as shown on the left side of FIG. 5A and FIGS. 5B, 5C and 5D. For example, connecting members 76 and slots 75 can be configured as a dovetail connection. Connecting members 76 and slots 75 can also be sized and configured so as to provide a snug interference fit or a snap-lock fit so as to maintain the connection between adjacent stringers 70. Alternatively, or in addition, any of a number of individual locking devices or structures can be used. Each slot 77 in the embodiment shown is generally L-shaped and includes a first leg 77A and a second leg 77B generally disposed at a right angle to first leg 77A.

Each tread 80 includes a projection 81 extending from each end thereof sized and configured to engage slots 77 in stringers 70. Slots 77 and projections 81 are sized and configured so as to produce a snug interference fit or a positive snap-lock fit. Alternatively, or in addition, any of a number of various locking mechanisms or structures can be used to retain treads 80 to stringers 70.

Handrail 90 includes a plurality of handrail sections 91, each of which has a first end 92 with a recess therein and a second end 93 with a projection 94 extending therefrom. Projections 94 engage recesses 92 in other handrails sections 91 so as to connect handrail sections 91 together to form handrail 90. Projections 94 and recesses 92 can be sized and configured so as to provide a snug interference fit or a snap-lock fit so as to maintain the connection between adjacent handrail sections 91. Alternatively, or in addition, any of a number of individual locking devices or structures can be used.

Figure 5A:
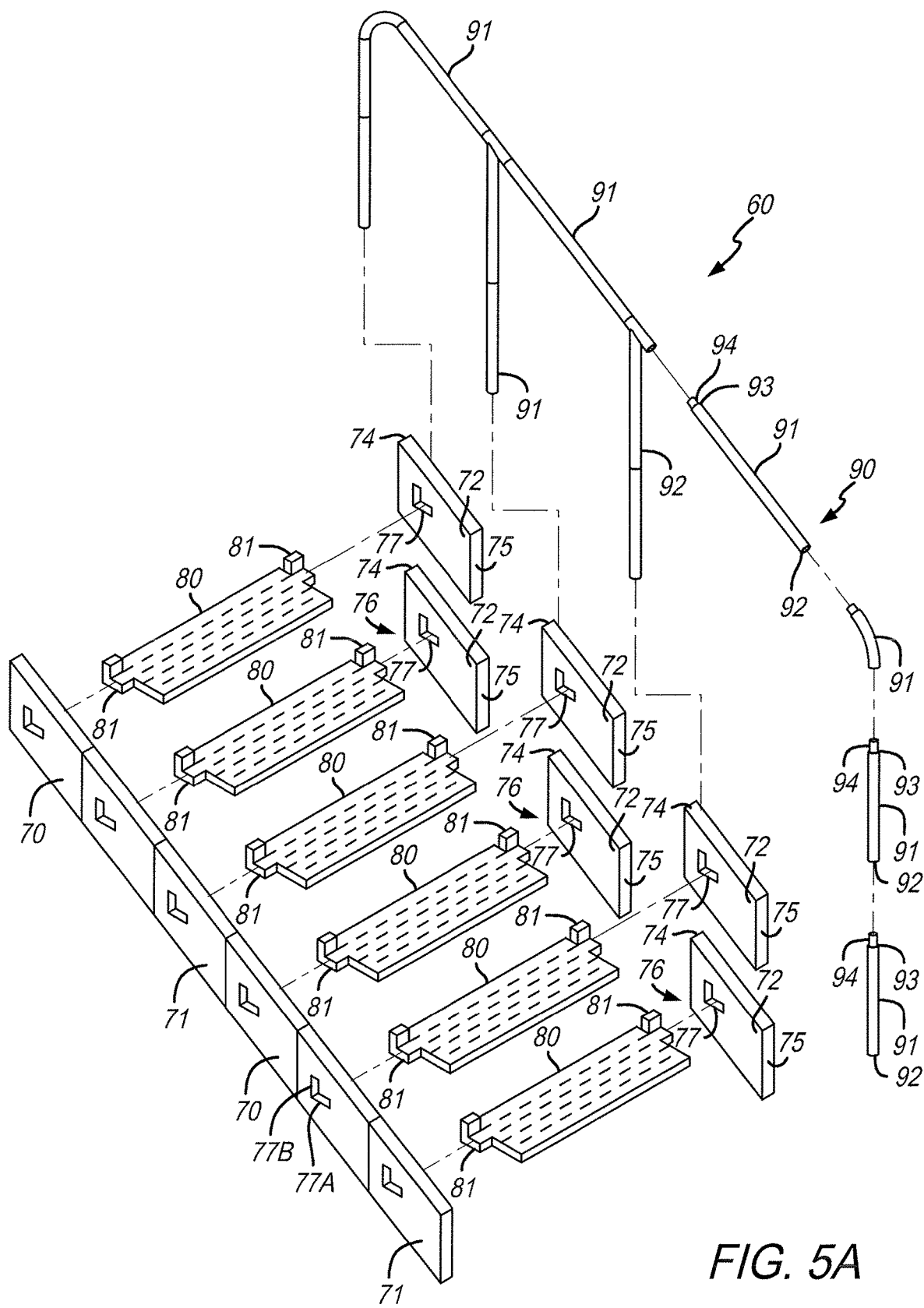
FIG. 5A is an exploded perspective view of a staircase/ladder structure that is a component of a modular platform system according to one embodiment of the present invention.
Figure 5B:
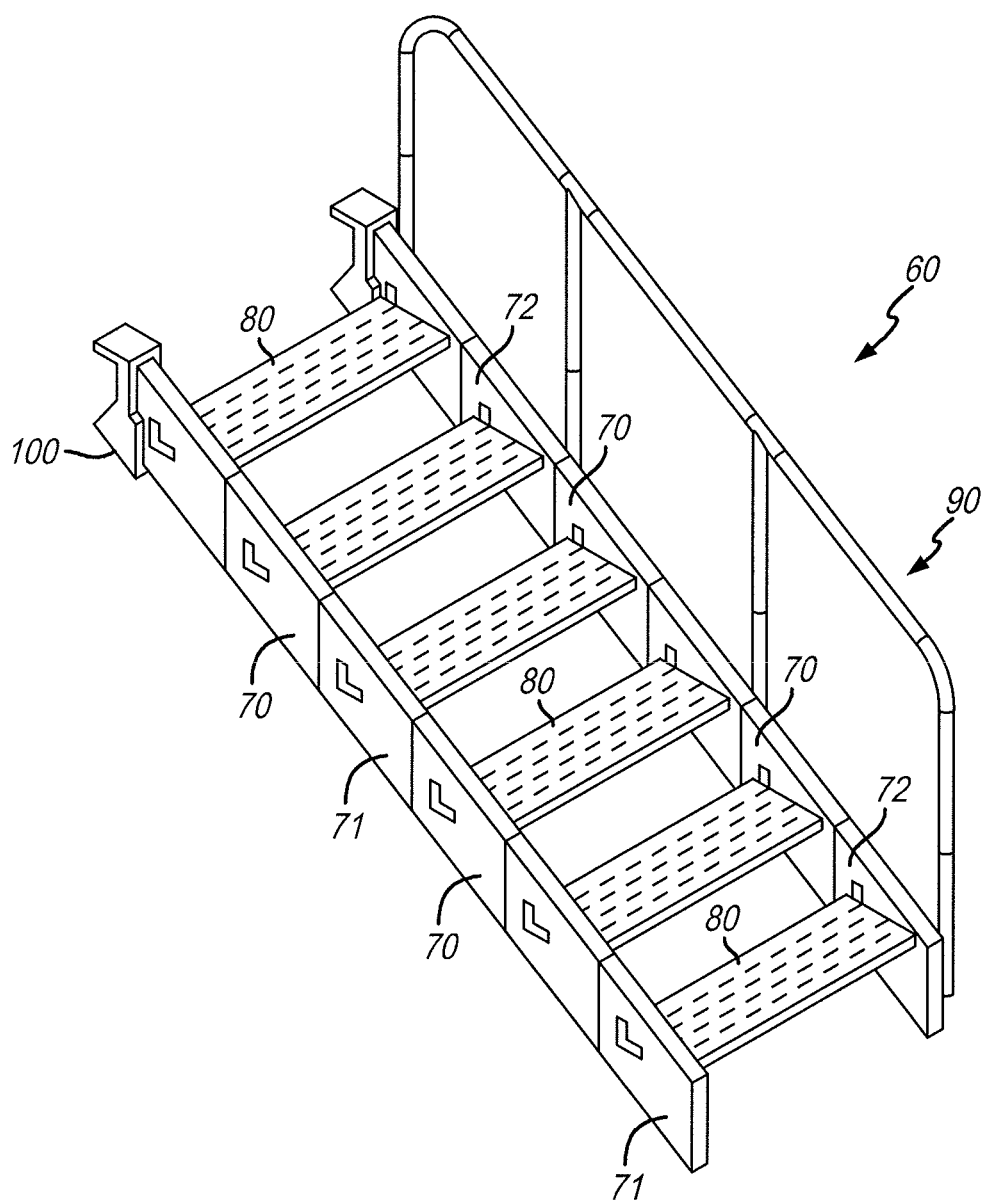
FIG. 5B is a perspective view of the staircase/ladder structure of FIG. 5A assembled in the staircase configuration.

As shown in FIG. 5B, two sets of stringers 70 can be joined together as described above and connected to projections 81 of treads 80 so as to form a staircase. As further shown in FIG. 5B, brackets 100 may include slots (not shown) for engaging connecting members 76 on stringers 70, thereby providing a structure for connecting the staircase to base module 20 or extension modules 30 as described below. Stringers 70 may also be provided with brackets, openings or other structures (not shown) to receive or engage one or more handrail sections 91 of handrail 90, thereby securing it to at least one set of stringers 70 as shown in FIG. 5B.

Figure 5C:
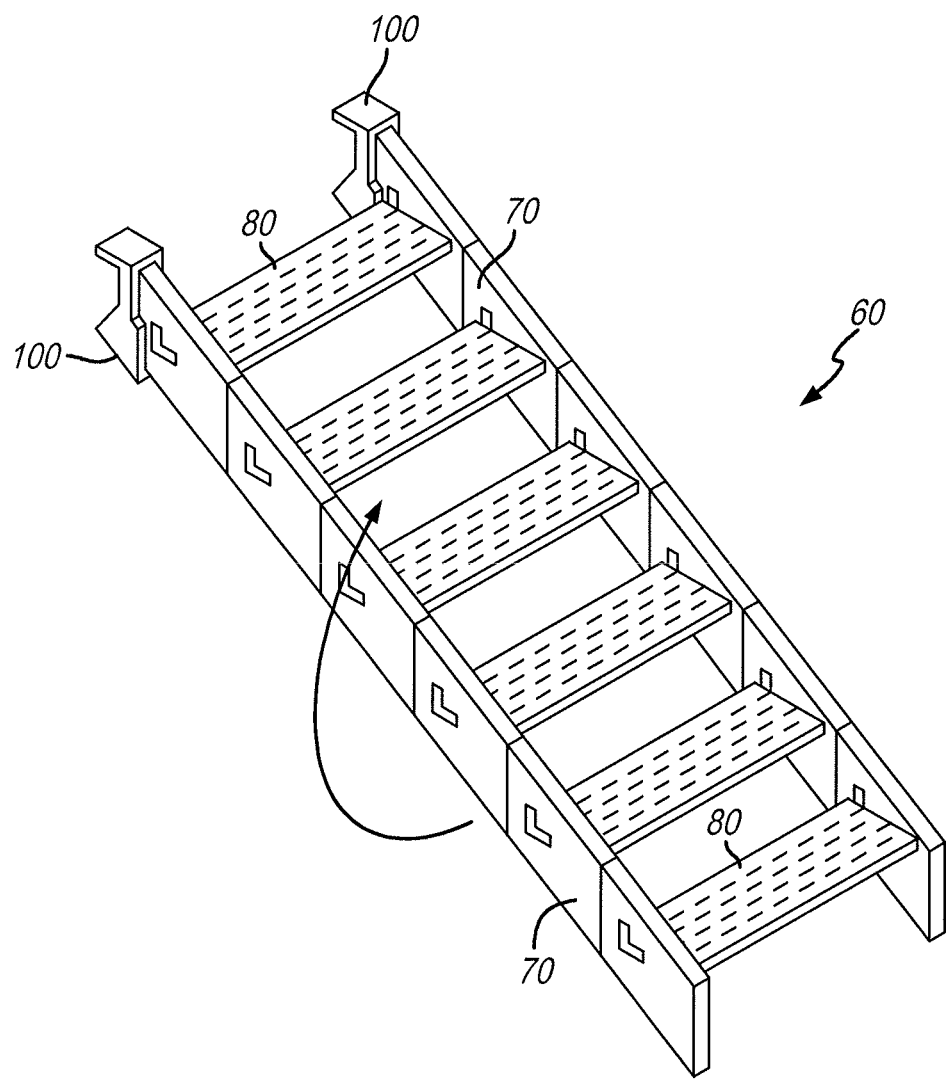
FIG. 5C is a perspective view of the staircase/ladder structure of FIG. 5A assembled in the staircase configuration.
Figure 5D:
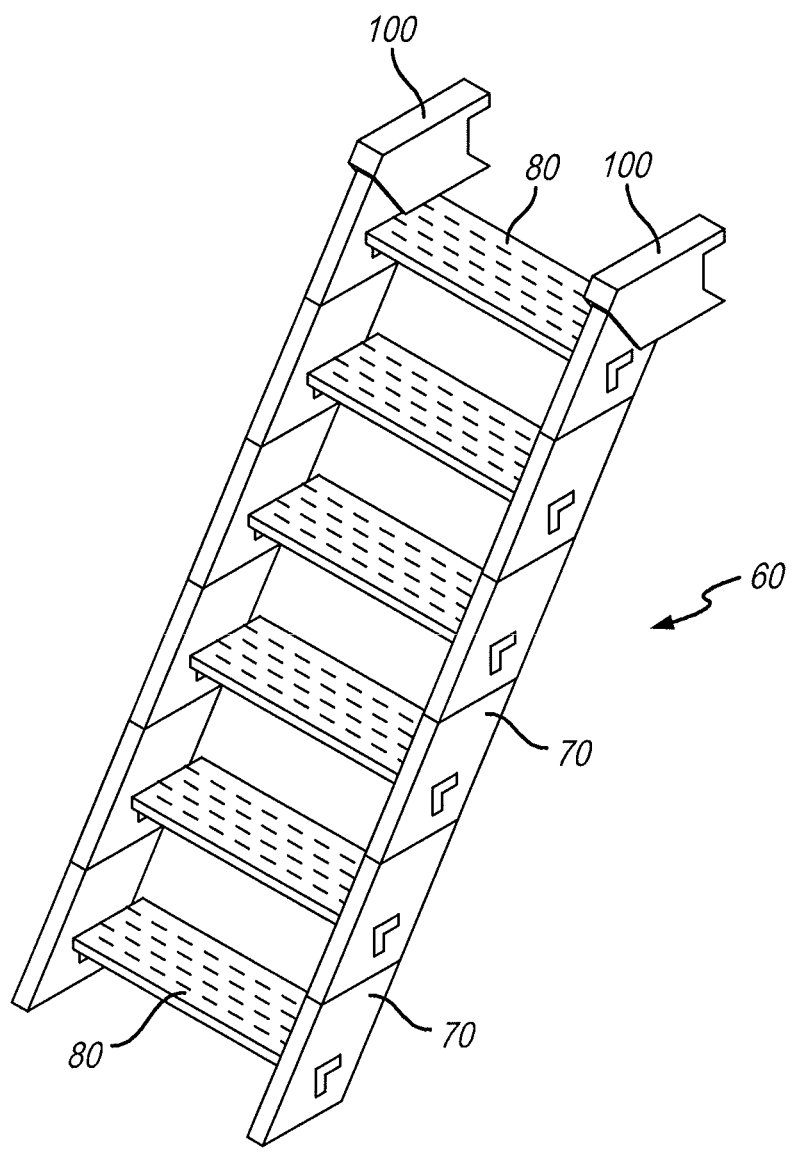
FIG. 5D is a perspective view of the staircase/ladder structure of FIG. 5A assembled in the ladder configuration.

As shown in FIGS. 5C and 5D, rotating stringers 70 and treads 80 90° from the orientation shown in FIG. 5C to the orientation shown in FIG. 5D and joining stringers 70 to treads 80 as described above produces a ladder configuration of the structure as shown in FIG. 5D.

Figure 6:
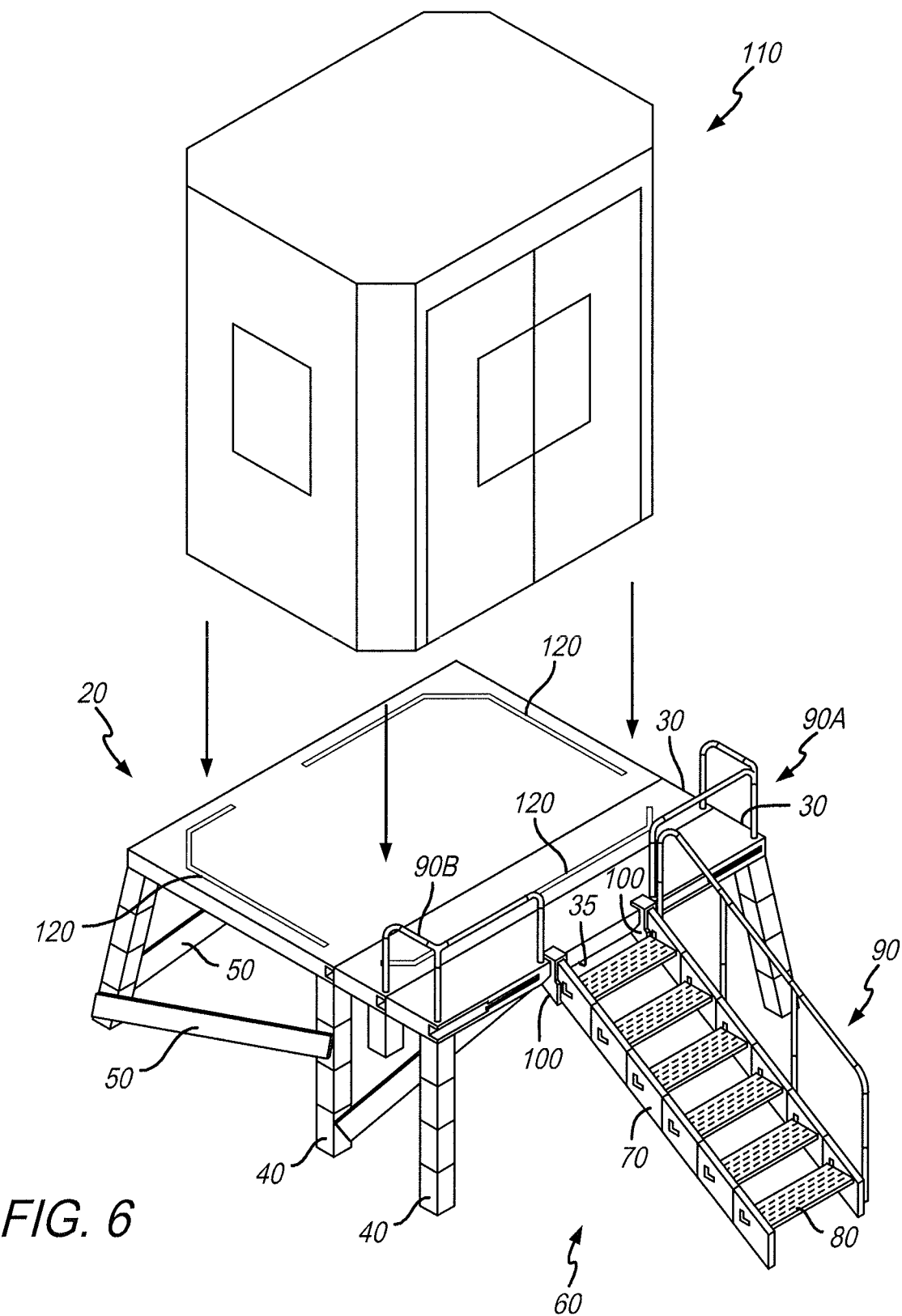
FIG. 6 is a perspective view of a modular platform system according to another embodiment of the present invention configured for supporting a hunting blind.

FIG. 6 shows a modular platform system according to one embodiment of the present invention utilized as a support for a hunting blind 110. In this embodiment, two extension modules 30 are connected to a base module 20 and the structure is elevated above the ground through the use of modular support members 40. Staircase/ladder structure 60 is arranged in the staircase configuration and connected to one extension module 30 by engaging brackets 100 with third side 35 of one extension module 30. This embodiment further includes supplemental handrail structures 90A and 90B secured to extension modules 30. Hunting blind 110 may be placed on base module 20 and/or extension modules 30 to support it above the ground. In this embodiment, connecting structures 120 are provided on base module 20 and one extension module 30 to provide structure to which hunting blind 110 can be secured. Connecting structures 120 can be any of a number of devices, such as wood strips fastened to base module 20 and extension module 30, projections integrally formed with base module 20 and extension module 30, or other structures. Hunting blind 110 may be connected to connection structures 120 by screws or other fasteners.

Figure 7:
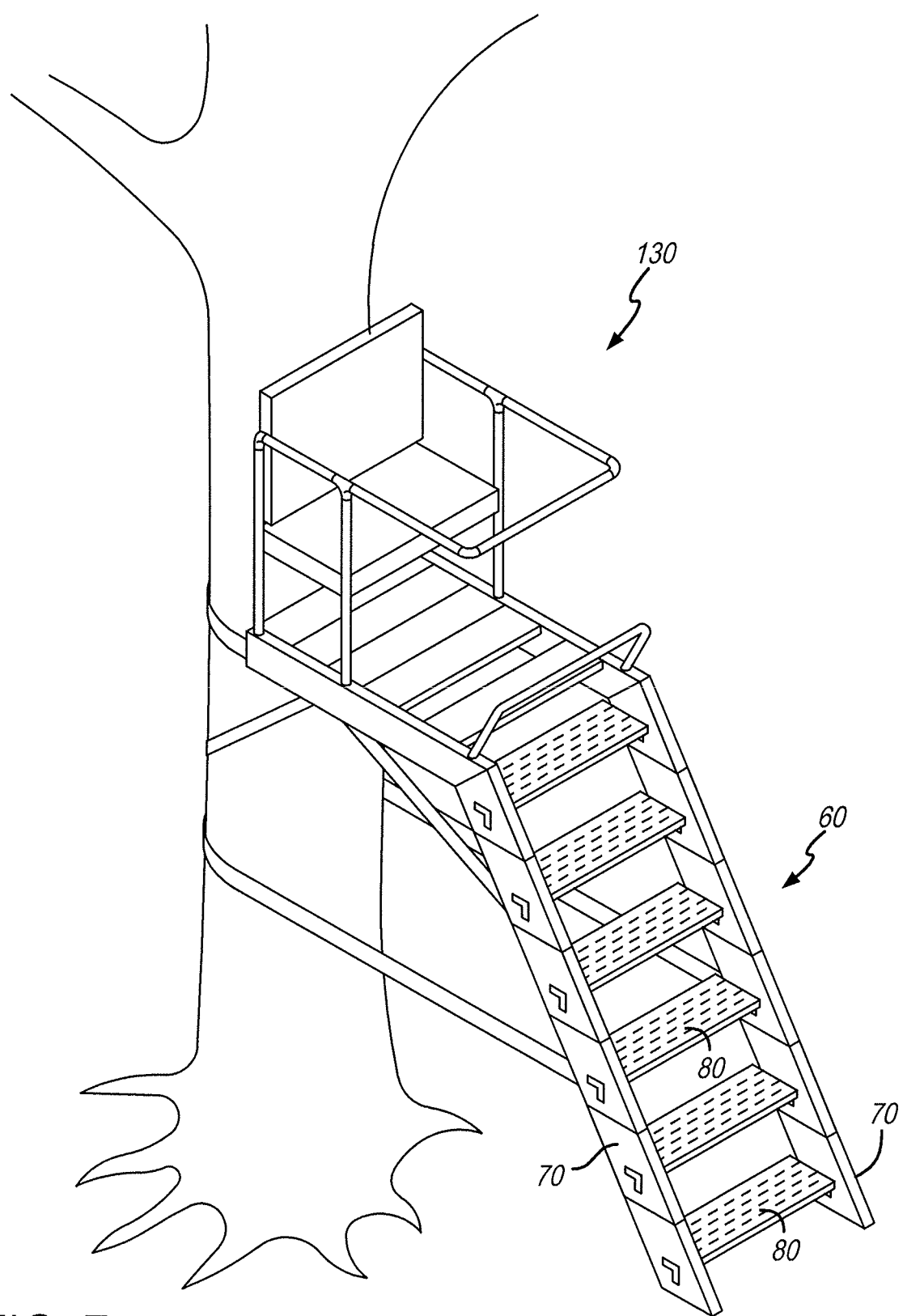
FIG. 7 is a perspective view of the staircase/ladder structure of FIG. 5A assembled in the ladder configuration and used in connection with a hunting tree stand.

FIG. 7 shows staircase/ladder structure 60 assembled in the ladder configuration and utilized in connection with a hunting tree stand 130.

The various components of the embodiments discussed above can be constructed from any of a number of materials that will provide sufficient strength and rigidity to permit the modular platform structure to perform its intended functions. For example, the various components can be formed from sufficiently strong and rigid plastic.

Although the present invention has been shown and described in detail the same is to be taken by way of example only and not by way of limitation. Numerous changes can be made to the embodiments described without departing from the scope of the invention. For example, the structures for joining base module 20 and extension modules 30 together can have configurations other than the dovetail configuration shown and described. The same is true of the structures used to join stringers 70 together. Base modules 20 can be provided with connecting members for joining one or more base modules 20 together. Base module 20 and extension modules 30 can be provided with connecting members and recesses on more than one side so as to increase the number of configurations that can be constructed using the system of the present invention. Furthermore, although slots 77 and projections 81 are L-shaped in the embodiments discussed above, other configurations of slots 77 and projections 81 can also be utilized.

What is claimed is:

1. A modular platform system, including:
   a base module having an upper surface, a lower surface, a first side, a second side adjacent the first side, a third side opposite the first side, and a fourth side opposite the second side;
   a first recess in the first side of the base module, the first recess having a first open section facing outwardly from the first side, a second, narrower open section facing outwardly from first side, a first closed end, and a second closed end;
   a second recess in the first side of the base module, the second recess having a first open section facing outwardly from the first side, a second, narrower open section facing outwardly from first side, a closed end, and an open end facing outwardly from the second side;
   an extension module having an upper surface, a lower surface, a first side, a second side adjacent the first side, a third side opposite the first side, and a fourth side opposite the second side;
   a first connecting member extending from the first side of the extension module, the first connecting member having a first section and a second, narrower section, the first connecting member configured to engage the first recess in the first side of the base module to secure the extension module to the base module; and
   a second connecting member extending from the first side of the extension module, the second connecting member having a first section and a second, narrower section, the second connecting member configured to engage the second recess in the first side of the base module to secure the extension module to the base module.

2. The modular platform system of claim 1, further including:
   a recess in the third side of the extension module, the recess in the third side of the extension module having a first open section facing outwardly from the third side and a second, narrower open section facing outwardly from third side;
   a second extension module, the second extension module having an upper surface, a lower surface, a first side, a second side, a third side, and a fourth side; and
   a connecting member extending from the first side of the second extension module, the connecting member of the second extension module having a first section and a second, narrower section, the connecting member of the second extension module configured to engage the recess in the third side of the extension module to secure the second extension module to the extension module.

3. The modular platform system of claim 2, wherein the recess in the third side of the extension module has a closed end and an open end.

4. The modular platform system of claim 3, wherein the open end of the recess in the third side of the extension module faces outwardly from the fourth side of the extension module.

5. The modular platform system of claim 1, further including a leg extending from the lower surface of the base module, the leg including a recess for receiving a support member.

6. The modular platform system of claim 5, further including a first support member having a first end having a projection configured to nest in the recess of the leg and a second end having a recess, and a second support member having a first end having a projection configured to nest in the recess of the second end of the first support member.

7. The modular platform system of claim 6, further including a second leg extending from the lower surface of the base module, the second leg including a recess for receiving a support member, a third support member having a first end having a projection configured to nest in the recess of the second leg and a second end having a recess, a fourth support member having a first end having a projection configured to nest in the recess of the second end of the third support member, and a bracing member having a first end connected to the second support member and a second end connected to the third support member.

8. A modular platform system, including:
   a base module having an upper surface, a lower surface, a first side extending from the upper surface to the lower surface, and a second side disposed perpendicular to the first side and extending from the upper surface to the lower surface;
   a first recess in the first side of the base module, the first recess facing outwardly from the first side of the base module and having a first closed end, and a second closed end;
   a second recess in the first side of the base module, the second recess facing outwardly from the first side of the base module and having a closed end and an open end facing outwardly from the second side of the base module; and
   an extension module having an upper surface, a lower surface, a first side extending from the upper surface to the lower surface, and a connecting member extending from the first side of the extension module and configured to engage the first recess in the first side of the base module to secure the extension module to the base module.

9. The modular platform system of claim 8, wherein the first recess has a first open section facing outwardly from the first side of the base module and a second, narrower open section facing outwardly from first side of the base module.

10. The modular platform system of claim 9, wherein the connecting member has a first section and a second, narrower section.

11. The modular platform system of claim 8, wherein the extension module further includes a second side opposite the first side of the extension module and a recess in the second side of the extension module, the recess in the second side of the extension module facing outwardly from the second side of the extension module and having a closed end and an open end.

12. The modular platform system of claim 11, wherein the extension module includes a third side disposed perpendicular to the first side and the second side and wherein the open end of the recess in the second side of the extension module faces outwardly from the third side of the extension module.

13. The modular platform system of claim 8, further including a leg extending from the lower surface of the base module, the leg including a recess for receiving a support member.

14. The modular platform system of claim 13 further including a first support member having a first end having a projection configured to nest in the recess of the leg and a second end having a recess, and a second support member having a first end having a projection configured to nest in the recess of the second end of the first support member.

15. The modular platform system of claim 14, further including a second leg extending from the lower surface of the base module, the second leg including a recess for receiving a support member, a third support member having a first end having a projection configured to nest in the recess of the second leg and a second end having a recess, a fourth support member having a first end having a projection configured to nest in the recess of the second end of the third support member, and a bracing member having a first end connected to the second support member and a second end connected to the third support member.

* * * * *